(12) United States Patent
Kaszas et al.

(10) Patent No.: US 10,035,383 B2
(45) Date of Patent: Jul. 31, 2018

(54) PNEUMATIC TIRE WITH POST CURE SEALANT LAYER

(71) Applicant: THE GOODYEAR TIRE & RUBBER COMPANY, Akron, OH (US)

(72) Inventors: Gabor Kaszas, Akron, OH (US); Gregory Daniel Zartman, Akron, OH (US); Andreas Frantzen, Trier (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 320 days.

(21) Appl. No.: 14/825,385

(22) Filed: Aug. 13, 2015

(65) Prior Publication Data
US 2017/0043629 A1  Feb. 16, 2017

(51) Int. Cl.
*B60C 19/12* (2006.01)
*B29C 73/16* (2006.01)
*B29C 73/20* (2006.01)
*B29D 30/06* (2006.01)
*B60C 5/14* (2006.01)

(52) U.S. Cl.
CPC .......... *B60C 19/122* (2013.01); *B29C 73/163* (2013.01); *B29C 73/20* (2013.01); *B29D 30/0685* (2013.01); *B60C 5/14* (2013.01); *B29D 2030/0695* (2013.01)

(58) Field of Classification Search
CPC .................................................. B29C 19/122
See application file for complete search history.

(56) References Cited

U.S. PATENT DOCUMENTS 3,935,893 A * 2/1976 Stang .................... B29C 73/163
   152/504
4,090,546 A * 5/1978 Honda ............... B29D 30/0685
   106/33
4,140,167 A * 2/1979 Bohm ................ B29D 30/0685
   152/505
4,161,202 A * 7/1979 Powell .................... B29C 73/20
   152/504

(Continued)

FOREIGN PATENT DOCUMENTS

AT         380893B B      7/1985
DE    102007023994 B4    10/2014

(Continued)

OTHER PUBLICATIONS

European Search Report dated Dec. 14, 2016 for Application Serial No. EP16184014.

*Primary Examiner* — Liam J Heincer
(74) *Attorney, Agent, or Firm* — John D. DeLong

(57) ABSTRACT

The present invention is directed to a pneumatic tire comprising a radially outer circumferential rubber tread disposed on a supporting carcass, an inner liner rubber layer radially inwardly disposed on the supporting carcass, and a sealant layer adhered to and disposed inwardly of the rubber inner liner layer as a radially inner surface of the tire, wherein the sealant layer comprises 100 parts by weight of elastomer comprising 5 to 10 parts by weight, per 100 parts by weight of elastomer (phr) of butyl rubber, 10 to 25 phr of bromobutyl rubber, and 65 to 85 phr of polybutene: and from 0.05 to 2 phr of a polymeric amine.

10 Claims, 5 Drawing Sheets

(56) References Cited

U.S. PATENT DOCUMENTS

| | | | |
|---|---|---|---|
| 4,171,237 A * | 10/1979 | Bohm | B29D 30/0005 152/504 |
| 4,228,839 A * | 10/1980 | Bohm | B29D 30/0005 152/504 |
| 4,256,857 A | 3/1981 | Buckler et al. | |
| 4,359,078 A | 11/1982 | Egan | |
| 4,539,344 A | 9/1985 | Omum et al. | |
| 4,665,963 A | 5/1987 | Timar et al. | |
| 4,810,752 A | 3/1989 | Bayan | |
| 4,895,610 A * | 1/1990 | Egan | B29D 30/00 152/507 |
| 4,919,183 A | 4/1990 | Dobson | |
| 5,295,525 A * | 3/1994 | Sanda, Jr. | B29C 73/163 106/33 |
| 6,552,108 B1 | 4/2003 | Wang et al. | |
| 8,399,572 B2 * | 3/2013 | Laakso, Jr. | C08K 5/0025 525/326.1 |
| 2001/0051681 A1 * | 12/2001 | Visel | B60C 1/0016 524/394 |
| 2004/0030036 A1 * | 2/2004 | Waddell | C08L 23/283 524/567 |
| 2004/0112506 A1 | 6/2004 | Naito et al. | |
| 2004/0198910 A1 * | 10/2004 | Fukutomi | B29C 73/163 525/194 |
| 2005/0034799 A1 * | 2/2005 | Serra | B29C 73/22 152/503 |
| 2006/0199933 A1 * | 9/2006 | Okamoto | C08K 5/09 528/29 |
| 2009/0084482 A1 * | 4/2009 | Majumdar | B29C 73/22 152/504 |
| 2014/0323645 A1 * | 10/2014 | Son | C08L 23/22 524/525 |
| 2015/0273944 A1 * | 10/2015 | Yukawa | B29D 30/0685 152/510 |
| 2016/0001612 A1 * | 1/2016 | Joo | B60C 5/00 152/155 |
| 2016/0068031 A1 * | 3/2016 | Kaszas | B60C 1/00 152/504 |
| 2016/0215131 A1 * | 7/2016 | Adkinson | C08L 23/26 |
| 2016/0236428 A1 * | 8/2016 | Dahlke | B29C 73/163 |
| 2016/0347127 A1 * | 12/2016 | Yukawa | B60C 19/002 |
| 2017/0029606 A1 * | 2/2017 | Kaszas | C08L 19/00 |

FOREIGN PATENT DOCUMENTS

| | | |
|---|---|---|
| EP | 1418199 B1 | 12/2007 |
| WO | WO2007070053 A1 | 6/2007 |
| WO | WO2015115486 A1 | 8/2015 |

* cited by examiner

PNEUMATIC TIRE WITH POST CURE SEALANT LAYER

BACKGROUND

Various methods, sealants and tire constructions have been suggested for pneumatic tires relating to the use of liquid sealant coatings in which the sealant flows into a puncture hole. However, such liquid sealants can flow excessively at elevated temperatures and cause the tire to become out of balance. Also, the liquid sealant may not be entirely operable or effective over a wide temperature range extending from summer to winter conditions. More complicated tire structures which encase a liquid sealant in a vulcanized rubber material can be expensive to manufacture and can also create balance and suspension problems due to the additional weight required in the tire.

Puncture sealing tires also have been further proposed wherein a sealant layer of degradable butyl based rubber, for example, is assembled between unvulcanized tire layers to provide a built-in sealant. By laminating the sealant layer between two or more non-degraded rubber layers, e.g., the tire inner liner and a tire carcass, the sealant layer retains its structural integrity during the vulcanization operation where high pressures are applied to the tire, which would otherwise displace the degraded rubber layer from its desired location. However, the compounds that typically are used in the built-in sealant, e.g., organic peroxide depolymerized butyl based rubber, can generate gases at higher temperature, such as during the tire cure or during tire use, which can result in aesthetically unappealing inner liner blister formation. Aside from being unappealing, such blister formation may allow the sealant to unfavorably migrate away from its intended location. To combat blister formation, the inner liner, for example, can be provided at an increased thickness but this can add to the cost of building a tire.

It is also known to directly apply sealant layers to tires after the cure process, or post cure. Such sealant layers generally are adhesively secured to the exposed surface of the innermost inner liner, and may be tacky and gel-like. Such post cure sealants as known in the art may not provide adequate long term seal against puncturing objects such as nails and the like.

Accordingly, there is a need for an improved post cure sealant layer for tires.

SUMMARY

The present invention is directed to a pneumatic tire comprising a radially outer circumferential rubber tread disposed on a supporting carcass, an inner liner rubber layer radially inwardly disposed on the supporting carcass, and a sealant layer adhered to and disposed inwardly of the rubber inner liner layer as a radially inner surface of the tire, wherein the sealant layer comprises 100 parts by weight of elastomer comprising 5 to 10 parts by weight, per 100 parts by weight of elastomer (phr) of butyl rubber, 10 to 25 phr of bromobutyl rubber, and 65 to 90 phr of polybutene; and from 0.05 to 2 phr of a polymeric amine.

DRAWINGS

DESCRIPTION

There is disclosed a pneumatic tire comprising a radially outer circumferential rubber tread disposed on a supporting carcass, an inner liner rubber layer radially inwardly disposed on the supporting carcass, and a sealant layer adhered to and disposed inwardly of the rubber inner liner layer as a radially inner surface of the tire, wherein the sealant layer comprises 100 parts by weight of elastomer comprising 5 to 10 parts by weight, per 100 parts by weight of elastomer (phr) of butyl rubber, 10 to 25 phr of bromobutyl rubber, and 65 to 90 phr of polybutene; and from 0.1 to 0.5 phr of a polymeric amine.

Figure 1:
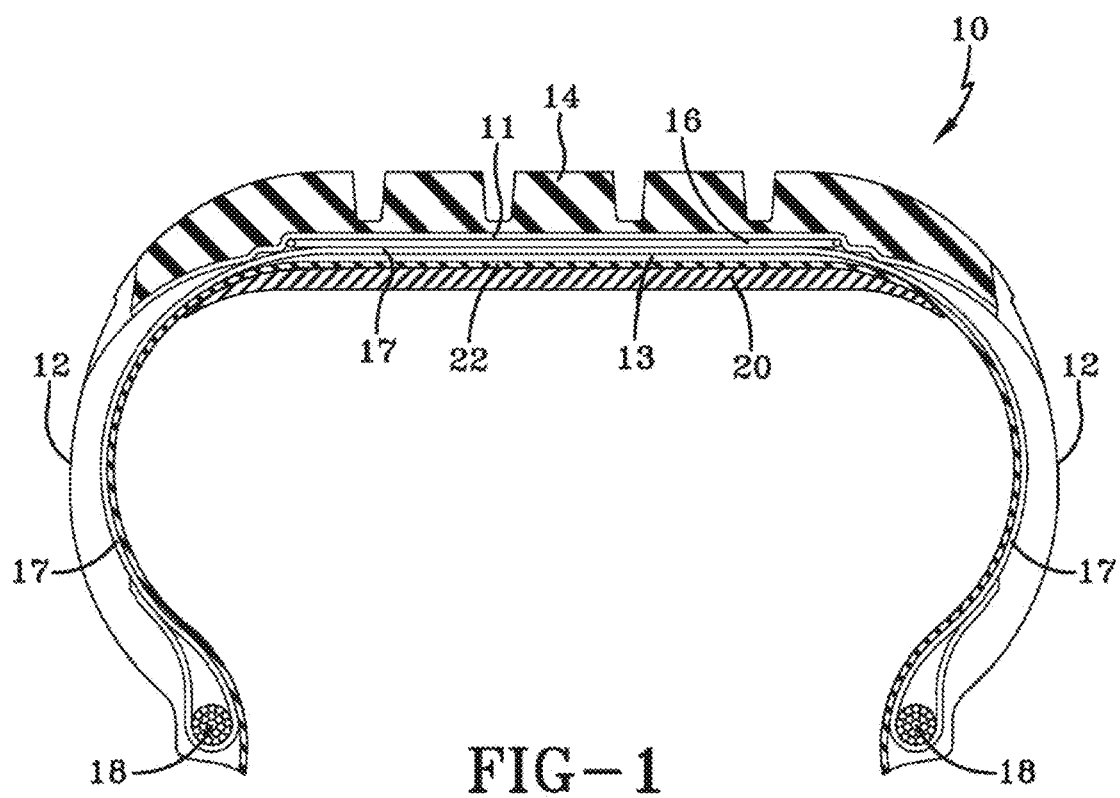
FIG. 1 shows a cross-sectional view of a pneumatic tire which contains a circumferential sealant layer which contains a post tire cure applied sealant layer adhered to the innerliner.

In FIG. 1, a cross-section of a cured pneumatic tire 10 is presented comprised of a tread 14 which includes a tread base rubber layer 11, sidewalls 12, spaced apart beads 18 and carcass underlying the tread 14 (including the tread base layer 11), comprised of cord reinforced (e.g. wire cord reinforced) rubber belt plies 16, cord reinforced (e.g. synthetic nylon or polyester cord reinforced) rubber carcass ply 17 and an optional rubber barrier layer 13 with inner liner rubber layer 22 being positioned radially inward of the carcass and optional barrier layer 13 and carcass ply 17 together with a sealant layer 20 forming the radially innermost surface of the tire.

The sealant layer includes a butyl rubber. As used herein the term "butyl rubber" is defined to mean a polymer predominately comprised of repeat units of isobutylene but including a few repeat units of a conjugated diene. Preferably from about 85% to about 99.5% by weight of the butyl rubber are repeat units derived from the polymerization of isobutylene, while from about 0.1% to about 15% by weight of the repeat units are derived from a conjugated diene having from 4 to 8 carbon atoms such as butadiene, isoprene, hexadiene, etc., with isoprene being preferred.

In one embodiment, the sealant layer includes from 5 to 10 parts by weight of butyl rubber, per 100 parts by weight of total elastomer (phr).

The sealant layer also includes a bromobutyl rubber. Bromobutyl rubber is defined to mean butyl rubber that contains at least 0.05% by weight bromine. Preferred bromobutyl rubbers are those that contain from about 0.1% to about 10% by weight bromine, more preferably from about 0.5% to about to about 5.0% by weight bromine based on the total weight of the brominated polymer.

Numerous patents disclose halogenated butyl rubber containing various amounts of chemically bound halogen, see for example, U.S. Pat. Nos. 2,631,984; 2,732,354; 3,099,644; 2,732,354; 2,944,578; 3,943,664; 2,964,489; and 4,130,534 (each fully incorporated herein by reference).

In one embodiment, the sealant layer includes from 10 to 25 phr of bromobutyl rubber.

The sealant layer also includes a polybutene. By polybutene, it is meant a polymer of one or more butene isomers including 1-butene, 2-butene, and 2-methylpropene (isobutylene). Such polybutene may be commercially referred to as polyisobutylene.

Such polybutenes preferably have a number average molecular weight exceeding about 600 to minimize the possibility of migration from the sealant layer into adjacent tire components. It is preferably prepared by polymerizing an isobutylene rich stream with a metal halide catalyst and preferably has a polymer backbone structure resembling polyisobutylene. Very suitable polybutenes are available under the trademark Indopol In one embodiment, the number average molecular weights (Mn) of the polybutene from about 600 to about 2500, as determined by vapor pressure osmometry.

In one embodiment, the sealant layer includes from 65 to 90 phr of polybutene.

The rubber composition further includes a polymeric amine. In embodiment, the polymeric amine has a primary amine functionality. Suitable polymeric amines include but are not limited to polyethyleneimine, polypropyleneimine, and polyoxyalkylene amines.

In one embodiment, the polymeric amine is a polyethyleneimine. In one embodiment, the polyethyleneimine has a number average molecular weight of 150 to 10000, preferably 150 to 5000, more preferably 200 to 2000. Suitable polyethyleneimine is available commercially as Lupasol from BASF.

In one embodiment, the polymeric amine is a polyoxyalkylene amine. The polyoxyalkylene amine can include a polyoxyalkylene monoamine, diamine, triamine, or combinations thereof. These compounds are defined by an amino group attached to a terminus of a polyether backbone and, thus, are considered polyether amines. The amino group is a primary amino group. Depending upon whether the polyoxyalkylene amine is a mono-, di-, or triamine, each compound can contain, respectively, one, two, or three amino groups, e.g. primary amino groups, with each group being attached to the terminus of a polyether backbone. Accordingly, one or more polyether backbones may be necessary to accommodate the number of terminal amino groups. Further description of polyoxyalkylene amines and their use is as disclosed in U.S. Pat. No. 7,714,051, fully incorporated herein by reference. Suitable polyoxyalkylene amines include polyoxyalkylene mono-, di-, and triamines commercially available from Huntsman Chemical of The Woodlands, Tex. and sold under the tradename JEFFAMINE®.

Polymeric amine may be used in an amount ranging from 0.05 to 2 phr. In one embodiment, the polymeric amine is used in an amount ranging from 0.1 to 1.5 phr. In one embodiment, the polymeric amine is used in an amount ranging from 0.2 to 1 phr.

Oils may be included in the sealant as a viscosity modifier. Suitable oils include oils such as mineral oils including but not limited to aromatic oils, naphthenic oils, paraffinic oils, MES oils, TDAE oils, RAE oils, and SRAE oils, and vegetable oils including but not limited to sunflower oil, soybean oil, corn oil, castor oil, and canola oil. Oil may be present in an amount ranging from 5 to 15 phr.

Resins may also be included in the sealant as a tackifier. Suitable resin include hydrocarbon resins, phenol/acetylene resins, rosin derived resins and mixtures thereof. Representative hydrocarbon resins include coumarone-indene-resins, petroleum resins, terpene polymers and mixtures thereof. Phenol/acetylene resins may be derived by the addition of acetylene to butyl phenol in the presence of zinc naphthlate. Additional examples are derived from alkylphenol and acetylene. Resin may be present in an amount ranging from 5 to 15 phr.

Other conventional compounding ingredients may be included in the mixing process, including but not limited to filler such as carbon black and silica, antidegradants, colorants, processing aids, and the like.

Mixing of the sealant composition may be accomplished for example by combining the elastomers and other components in a rubber mixer such as a Brabender internal mixer, extruder, or the like. Following mixing and cure, the sealant composition is applied to the innerliner of a cured tire. A suitable process for mixing the sealant and applying to a tire innerliner is as disclosed in U.S. Pat. No. 8,821,982.

Figure 2:
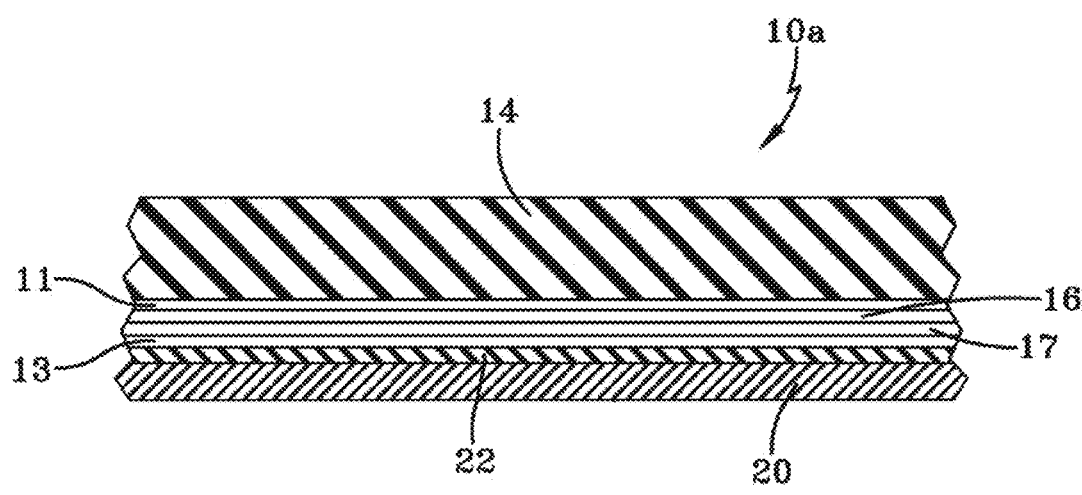
FIG. 2 shows a partial cross-sectional view of a portion of the tire with a post-tire cure applied sealant layer.

FIG. 2 depicts a partial cross-section of the sulfur cured pneumatic tire 10, labeled as 10a in FIG. 2, comprising the tire tread 14 with its tread base rubber layer 11, wire cord reinforced rubber belt plies 16, carcass with synthetic cord reinforced rubber carcass ply 17 (e.g. synthetic fiber based cord such as, for example, nylon or polyester cord), optional rubber barrier layer 13, rubber inner liner 22 and sealant layer 20. The sealant layer 20 is applied to the inner liner 22 of the already cured tire (and is therefore a post tire cure applied sealant layer) to provide a tire with a sealant layer with puncture sealing properties against various puncturing objects.

The thickness of the circumferential sealant layer 20 can vary depending somewhat upon the degree of sealing ability desired as well as the tire itself, including the tire size and intended tire use. For example, the thickness of the sealant layer may range from about 0.13 cm (0.05 inches) to about 1.9 cm (0.75 inches) depending somewhat upon the tire itself and its intended use. For example, in passenger tires, the sealant layer 20 might, for example, have a thickness in a range of about 0.33 cm (0.125 inches) whereas for truck tires, the sealant layer 20 might, for example, have a thickness in a range of about 0.76 cm (0.3 inches). The post cured tire applied wsealant layer 20 is generally situated in the crown region of the tire 10, and, if desired, may include colorant so that it is of a non-black color that may contrast with the black colored inner liner, tread, or sidewall so that a tire puncture can be noticed.

The tire inner liner rubber layer 22 may be comprised of a conventional sulfur curable rubber inner liner for use in pneumatic tires. In one example, the rubber innerliner 22 can be a sulfur curative-containing halobutyl rubber composition of a halobutyl rubber such as for example chlorobutyl rubber or bromobutyl rubber. Such halobutyl rubber based inner liner layer may also contain one or more sulfur curable diene-based elastomers such as, for example, cis-1,4-polyisoprene natural rubber, cis-1,4-polybutadiene rubber and styrene/butadiene rubber, or mixtures thereof. The inner liner 22 is normally prepared by conventional calendering or milling techniques to form a strip of uncured compounded rubber of appropriate width. When the tire 10 is cured, the inner liner 22 becomes co-cured and thereby integral with, the tire 10. Tire inner liner rubber layers and their methods of preparation are well known to those having skill in such art.

EXAMPLE 1

In this example, the selective cure of bromobutyl rubber by a polymeric amine in a blend of bromobutyl rubber and butyl rubber is illustrated.

Two rubber compounds were prepared by blending components in a laboratory mixer, with amounts as shown in Table 1 (all amounts in phr)

TABLE 1

| | Sample No. | |
|---|---|---|
| | 1 | 2 |
| Butyl Rubber | 0 | 80 |
| Bromobutyl Rubber | 100 | 20 |
| Polyethyleneimine[1] | 0.75 | 0.70 |
| Magnesium oxide | 3 | 3 |

[1]Lupasol FG, from BASF

Figure 3:
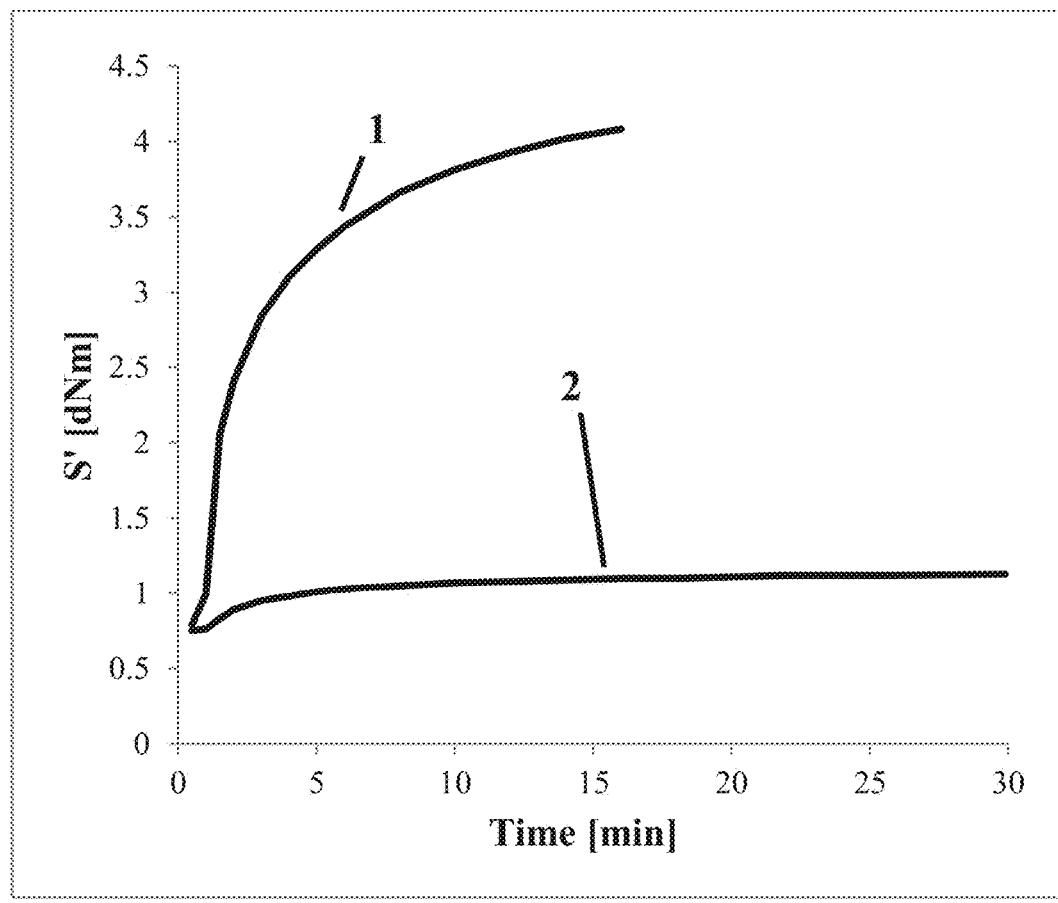
FIG. 3 shows cure data for two rubber compositions.

The mixed compounds were tested for cure properties at 160° C. using an ARES G@. FIG. 3 shows the torque versus time for Samples 1 and 2. As seen in FIG. 3, Sample 1 with 100% bromobutyl rubber shows rapid increase in torque to a high maximum value indicating cure of the bromobutyl rubber with the amine. By contrast, Sample 2 with 20% bromobutyl rubber and 80% butyl rubber shows a much slower increase in torque to a low maximum, indicating cure of the bromobutyl rubber but little to no cure of the butyl rubber.

EXAMPLE 2

In this example, the effect of varying the amount of polymeric amine on the viscoelastic properties of a blend of bromobutyl rubber and butyl rubber is illustrated.

Three rubber compounds were prepared by blending components in a laboratory mixer, with amounts as shown in Table 2 in phr based on the total elastomer amount of bromobutyl rubber and butyl rubber.

TABLE 2

| | Sample No. | | |
|---|---|---|---|
| | 3 | 4 | 5 |
| Butyl Rubber | 85 | 85 | 90 |
| Bromobutyl Rubber | 15 | 15 | 10 |
| Polyethyleneimine[1] | 1.05 | 0.26 | 0.18 |
| Magnesium oxide | 3 | 3 | 3 |

[1]Lupasol FG, from BASF

Figure 4:
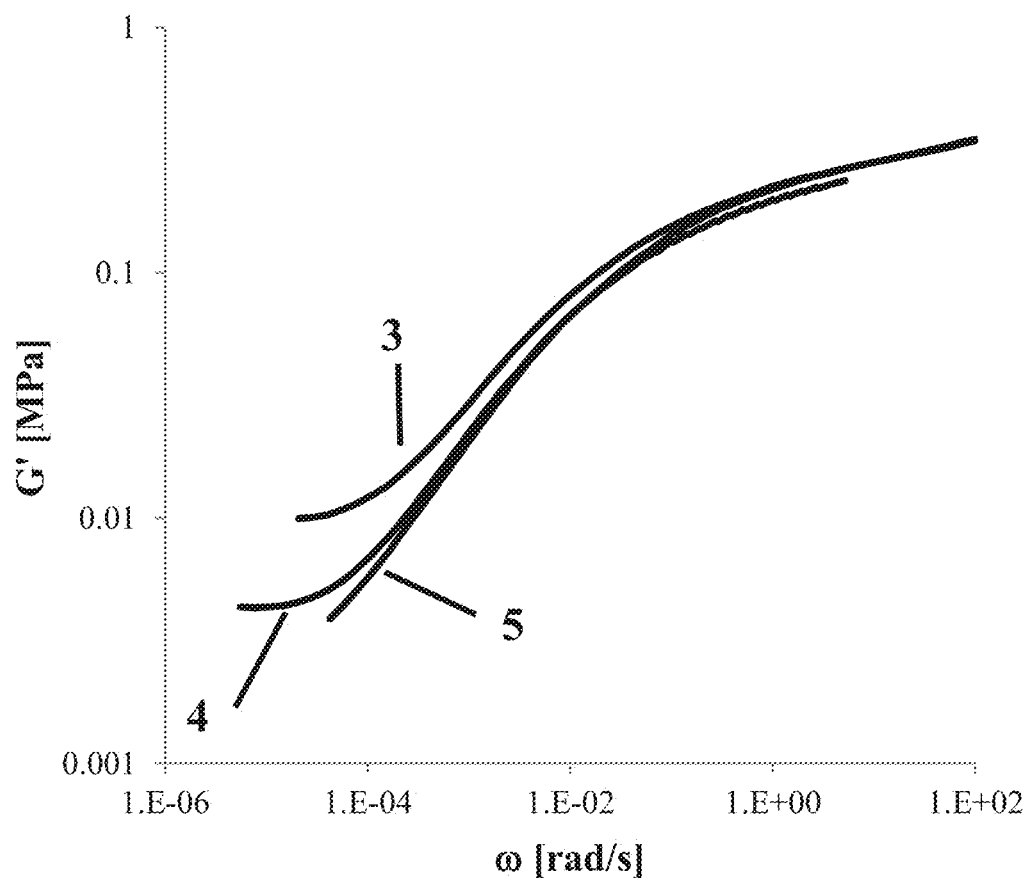
FIG. 4 shows viscoelastic data for two rubber compositions.

The mixed compounds were tested for viscoelastic properties (G', elastic modulus) using an ARES G2. Samples were cured at 160° C. for 16 minutes, then tested using a frequency sweep at constant strain of 0.5%. The results of the measurement of G' over the tested frequency range is shown in FIG. 4. As seen in FIG. 4, as the amount of polyethyleneimine is lowered, the observed equilibrium modulus (modulus plateau value at low frequency) decreases, extending the power law behavior of the modulus to lower frequency values. Thus it is seen that Sample 4 shows a lower rubbery plateau and equilibrium modulus than Sample 3. Likewise, the power law region for Sample 5 is extended to lower frequency than is observed for Samples 4 and 5. Such behavior with lower equilibrium modulus and extended power law region for G' is advantageous in a gel system as desired for a tire sealant.

EXAMPLE 3

In this example, the effect of varying the amount of polymeric amine on the viscoelastic properties of a blend of bromobutyl rubber and butyl rubber in the presence of a low molecular weight polymer diluent (polybutene) is illustrated.

Three rubber compounds were prepared by solution blending of components, with amount as shown in Table 3 in phr based on the total elastomer amount of bromobutyl rubber, butyl rubber, and polybutene. Compound mixing was facilitated using cyclohexane as a solvent, followed by removal of the cyclohexane.

TABLE 3

| | Sample No. | | |
|---|---|---|---|
| | 6 | 7 | 8 |
| Butyl Rubber | 10 | 10 | 10 |
| Bromobutyl Rubber | 15 | 15 | 15 |
| Polybutene[1] | 75 | 75 | 75 |
| Polyethyleneimine[2] | 0.53 | 0.21 | 0.10 |

Figure 5:
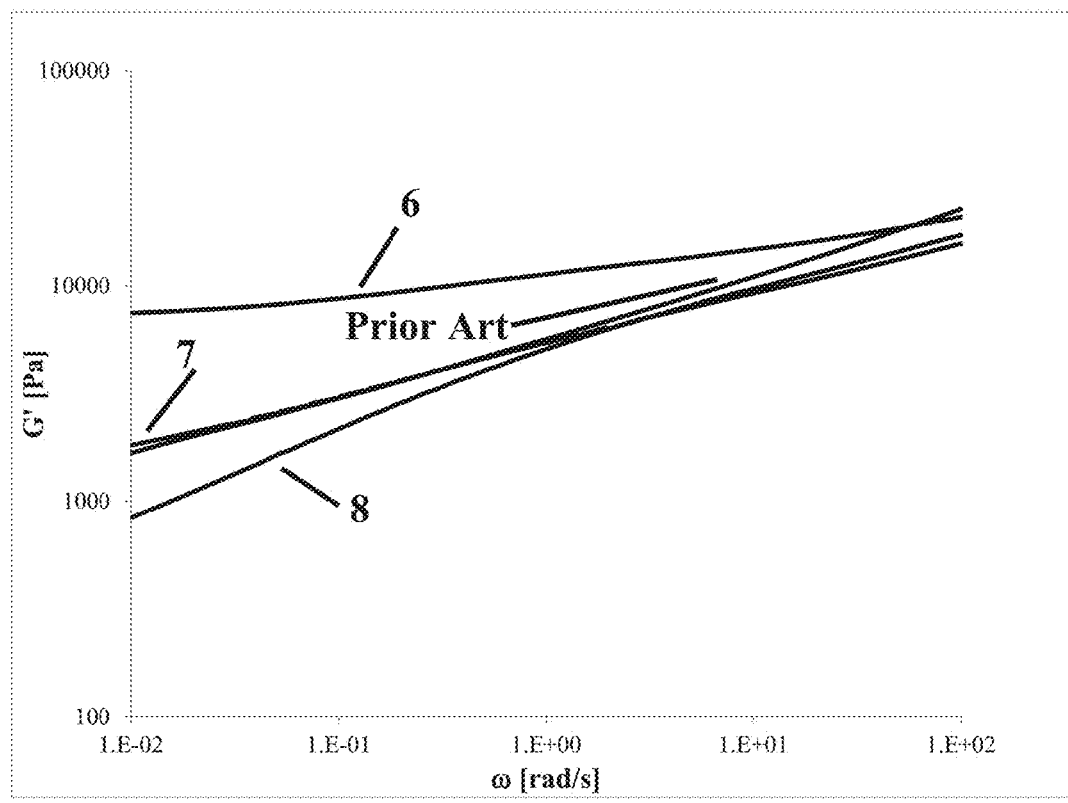
FIG. 5 shows viscoelastic data for several rubber compositions.

[1]Molecular weight (number average) = 920 g/mol, from Aldrich.
[2]Lupasol FG, from BASF; phr based on amount of butyl, bromobutyl, and polybutene The mixed compounds were tested for viscoelastic properties (G', elastic modulus) using an ARES G2. Samples were cured at 160° C. for 16 minutes, then tested using a frequency sweep at constant strain of 0.5%. The results of the measurement of G' over the tested frequency range is shown in FIG. 5. For comparison, a sample of a tire sealant from a commercially available tire was also analyzed. The comparison sealant was taken from a Contiseal summer tire, with the sealant analyzed as including butyl rubber, mineral oil, and a p-dioximequinone/peroxide curative. The commercial sealant included no bromobutyl rubber.

As seen in FIG. 5, decreased curative level progressively for Samples 6-8 leads to a reduced G' and increased slope of G' vs frequency. Significantly, the medium curative level (Sample 7) most closely tracks the desired behavior of the commercial sealant.

EXAMPLE 4

In this example, the effect of varying the amount of low molecular weight polymer diluent on the viscoelastic properties of a blend of bromobutyl rubber and butyl rubber cured with an approximately constant cure level is illustrated.

Three rubber compounds were prepared by solution blending of components, with amounts as shown in Table 4 in phr based on the total elastomer amount of bromobutyl rubber, butyl rubber, and polybutene. Compound mixing was facilitated using cyclohexane as a solvent, followed by removal of the cyclohexane.

TABLE 4

| | Sample No. | | |
|---|---|---|---|
| | 9 | 10 | 11 |
| Butyl Rubber | 5 | 5 | 5 |
| Bromobutyl Rubber | 20 | 15 | 10 |
| Polybutene[1] | 75 | 80 | 85 |
| Polyethyleneimine[2] | 0.22 | 0.21 | 0.18 |

Figure 6:
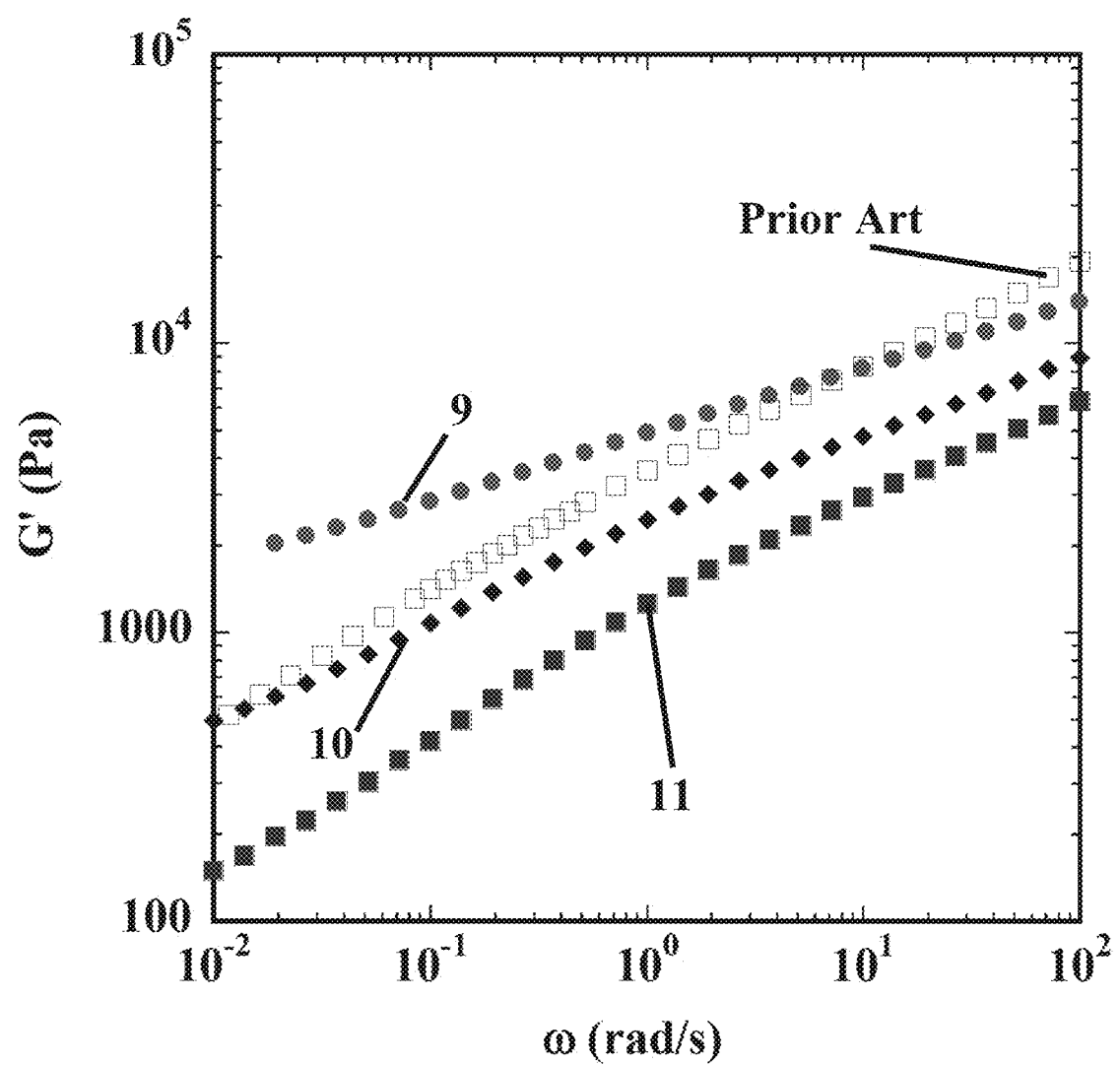
FIG. 6 shows viscoelastic data for several rubber compositions.

[1]Molecular weight (number average) = 920 g/mol, from Aldrich.
[2]Lupasol FG, from BASF; phr based on amount of butyl, bromobutyl and polybutene The mixed compounds were tested for viscoelastic properties (G', elastic modulus) using an RPA ARES G2. Samples were cured at 160° C. for 16 minutes, then tested using a frequency sweep at constant strain of 0.5%. The results of the measurement of G' over the tested frequency range is shown in FIG. 6. For comparison, a sample of a tire sealant from a commercially available tire was also analyzed. The comparison sealant was taken from a Contiseal summer tire, with the sealant analyzed as including butyl rubber, mineral oil, and a p-dioximequinone/peroxide curative. The commercial sealant included no bromobutyl rubber.

As seen in FIG. 6, decreased bromobutyl level progressively for Samples 9-11 leads to a reduced G' and increased slope of G' vs frequency. Significantly, Sample 10 most closely tracks the desired behavior of the commercial sealant.

EXAMPLE 5

In this example, the effect of a sealant composition on the ability to seal a puncture in a rubber sample is illustrated. A sealant composition was mixed in a 20 liter conical twin mixer (Colmec CTM-95) with amounts given in Table 5 in phr based on the total elastomer amount of bromobutyl rubber, butyl rubber, and polyisobutylene.

TABLE 5

| | Sample No. 12 |
|---|---|
| Bromobutyl Rubber | 15 |
| Butyl Rubber | 5 |
| Polyisobutylene[5] | 80 |
| Magnesium oxide[1] | 1 |
| ASTM N326 carbon black | 10 |
| Oil[2] | 8 |
| Resin A[3] | 6 |
| Resin B[4] | 4 |
| PEI[6] | 0.35 |

[1]Magnesium oxide paste with 20% emulsion softener
[2]Low poly-cyclic oil of low viscosity
[3]A non-staining mixture of straight chained petroleum hydrocarbon resins with a non-staining antioxidant and containing considerable cyclic but no aromatic structures. Softening point 100 +/− 3 C.
[4]A mixture of alkylated naphthenic and aromatic resins with a maximum of 2% dusting agent (talc) added to prevent sticking. Softening point 101 +/− 5 C.
[5]Indopol H-300 from Ineos. $M_n$ = 1300 g/mol.
[6]Lupasol FG: Low molecular weight (800) highly charged, cationic ethylenimine copolymer. Common Chemical Name: Polyethylenimine (PEI)

A series of holes of various diameter were drilled into a cured rubber mat consisting of sequential layers of tread compound, reinforcement material, and innerliner compound, each layer being 2 mm thick. The rubber mat was cooled with liquid nitrogen before holes with diameters of 1 mm, 2 mm and 3 mm were drilled. Cured sealant compound was dispensed on silicon coated paper which was then cut to the required sample size and transferred to the rubber mat, followed by removal of the paper. Nails with diameter 5 mm were inserted in the pre-drilled holes. The sample was then pressurized to 2.5 bars, followed by removal of the nails. The holes were then visually inspected immediately after nail removal and 15 minutes after nail removal, with results as given in Tables 6-8.

Samples were cured in a hot air oven for the specified time and at the specified temperature.

Nail removal was done at room temperature.

TABLE 6

Sealant cure for 15 minutes @ 140° C.

| | Status immediately after nail removal | | | | Status 15 minutes after nail removal | | |
|---|---|---|---|---|---|---|---|
| | Hole # 1 | Hole # 2 | Hole # 3 | | Hole # 1 | Hole # 2 | Hole # 3 |
| Hole 1 mm Nail 5 mm | Sealed | Sealed | Sealed | Hole 1 mm Nail 5 mm | Sealed | Sealed | Sealed |
| Hole 2 mm Nail 5 mm | Sealed | Sealed | Sealed | Hole 2 mm Nail 5 mm | Sealed | Sealed | Sealed |
| Hole 3 mm Nail 5 mm | Sealed | Sealed | Sealed | Hole 3 mm Nail 5 mm | Sealed | Sealed | Sealed |

TABLE 7

Sealant cured for 10 minutes @150° C.

| | Status immediately after nail removal | | | | Status 15 minutes after nail removal | | |
|---|---|---|---|---|---|---|---|
| | Hole # 1 | Hole # 2 | Hole # 3 | | Hole # 1 | Hole # 2 | Hole # 3 |
| Hole 1 mm Nail 5 mm | Sealed | Sealed | Sealed | Hole 1 mm Nail 5 mm | Sealed | Sealed | Sealed |
| Hole 2 mm Nail 5 mm | Sealed | Sealed | Sealed | Hole 2 mm Nail 5 mm | Sealed | Sealed | Sealed |
| Hole 3 mm Nail 5 mm | Sealed | Sealed | Sealed | Hole 3 mm Nail 5 mm | Sealed | Sealed | Sealed |

TABLE 8

Sealant cured for 52 minutes @160° C.

| | Status immediately after nail removal | | | | Status 15 minutes after nail removal | | |
|---|---|---|---|---|---|---|---|
| | Hole # 1 | Hole # 2 | Hole # 3 | | Hole # 1 | Hole # 2 | Hole # 3 |
| Hole 1 mm Nail 5 mm | Sealed | Sealed | N/a | Hole 1 mm Nail 5 mm | Sealed | Sealed | N/a |
| Hole 2 mm Nail 5 mm | Sealed | Sealed | Sealed | Hole 2 mm Nail 5 mm | Sealed | Sealed | Sealed |
| Hole 3 mm Nail 5 mm | Sealed | Sealed | Sealed | Hole 3 mm Nail 5 mm | Sealed | Sealed | Sealed |

EXAMPLE 6

The procedure of Example 5 was repeated, with the sealant as given in Table 9. Nail removal was done at room temperature and at −25° C., with results given in Tables 10-11.

TABLE 9

| | |
|---|---|
| Bromobutyl | 15 |
| Butyl | 5 |
| Polyisobutylene[5] | 80 |
| Magnesium oxide[1] | 1 |
| Calcium Carbonate | 10 |
| Polyisobutylene[2] | 8 |
| Resin A[3] | 6 |
| Resin B[4] | 4 |
| PEI[6] | 0.35 |

[1]Magnesium oxide paste with 20% emulsion softener
[2]Indopol H-25 from Ineos. $M_n$ = 635 g/mol
[3]A non-staining mixture of straight chained petroleum hydrocarbon resins with a non-staining antioxidant and containing considerable cyclic but no aromatic structures. Softening point 100 +/− 3 C.
[4]A mixture of alkylated naphthenic and aromatic resins with a maximum of 2% dusting agent (talc) added to prevent sticking. Softening point 101 +/− 5 C.
[5]Indopol H300 from Ineos. $M_n$ = 1300 g/mol.
[6]Lupasol FG: Low molecular weight (800) highly charged, cationic ethylenimine copolymer. Common Chemical Name: Polyethylenimine (PEI)

TABLE 10

Sealant cured for 10 minutes @150° C.

| | Status immediately after nail removal Removal at −25° C. | | | | Status 15 minutes after nail removal Removal at −25° C. | | |
|---|---|---|---|---|---|---|---|
| | Hole # 1 | Hole # 2 | Hole # 3 | | Hole # 1 | Hole # 2 | Hole # 3 |
| Hole 1 mm Nail 5 mm | sealed | sealed | sealed | Hole 1 mm Nail 5 mm | sealed | sealed | sealed |
| Hole 2 mm Nail 5 mm | sealed | sealed | sealed | Hole 2 mm Nail 5 mm | sealed | sealed | sealed |
| Hole 3 mm Nail 5 mm | sealed | sealed | sealed | Hole 3 mm Nail 5 mm | sealed | sealed | sealed |

TABLE 11

Sealant cured for 10 minutes @ 150° C.

| | Status immediately after nail removal Removal at room temperature | | | | Status 15 minutes after nail removal Removal at room temperature | | |
|---|---|---|---|---|---|---|---|
| | Hole # 1 | Hole # 2 | Hole # 3 | | Hole # 1 | Hole # 2 | Hole # 3 |
| Hole 1 mm Nail 5 mm | sealed | sealed | sealed | Hole 1 mm Nail 5 mm | sealed | sealed | sealed |
| Hole 2 mm Nail 5 mm | sealed | sealed | sealed | Hole 2 mm Nail 5 mm | sealed | sealed | sealed |
| Hole 3 mm Nail 5 mm | sealed | sealed | sealed | Hole 3 mm Nail 5 mm | sealed | sealed | sealed |

What is claimed is:

1. A pneumatic tire comprising a radially outer circumferential rubber tread disposed on a supporting carcass, an inner liner rubber layer radially inwardly disposed on the supporting carcass, and a sealant layer adhered to and disposed inwardly of the rubber inner liner layer as a radially inner surface of the tire, wherein the sealant layer comprises
    100 parts by weight of elastomer comprising 5 to 10 parts by weight, per 100 parts by weight of elastomer (phr) of butyl rubber, 10 to 15 phr of bromobutyl rubber, and 65 to 85phr of polybutene; and
    from 0.35 to 2 phr of a polymeric amine.

2. The pneumatic tire of claim 1, wherein the sealant layer further comprises from 5 to 15 phr of a resin.

3. The pneumatic tire of claim 1, wherein the sealant layer further comprises from 5 to 15 phr of an oil.

4. The pneumatic tire of claim 1, wherein the polymeric amine is selected from the group consisting of polyethyleneimine, polypropyleneimine, and polyoxyalkylene amines.

5. The pneumatic tire of claim 1, wherein the polymeric amine is a polyethyleneimine having a number average molecular weight of from 100 to 10000.

6. The pneumatic tire of claim 1, wherein the polymeric amine is a polyethyleneimine having a number average molecular weight of from 200 to 2000.

7. The pneumatic tire of claim 1, wherein the polybutene has a number average molecular weight ranging from 600 to 2500.

8. The pneumatic tire of claim 2, wherein the resin is selected from the group consisting of hydrocarbon resins, phenol/acetylene resins, rosin derived resins and mixtures thereof.

9. The pneumatic tire of claim 3, wherein the oil is selected from the group consisting of aromatic oils, naphthenic oils, paraffinic oils, MES oils, TDAE oils, RAE oils, and SRAE oils, sunflower oil, soybean oil, corn oil, castor oil, and canola oil.

10. The pneumatic tire of claim 1, wherein in the polymeric amine comprises a primary amine functionality.

* * * * *